UNITED STATES PATENT OFFICE.

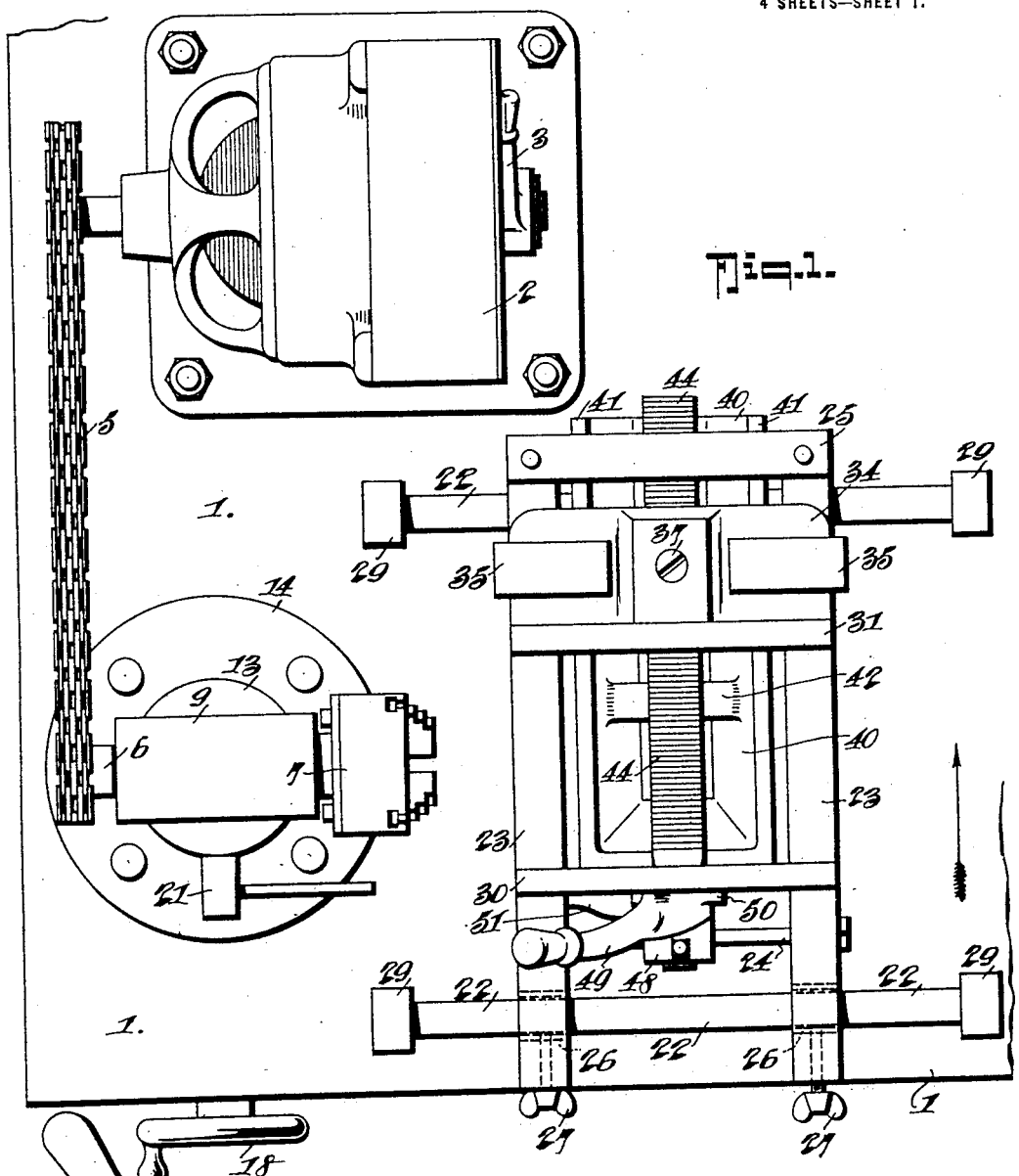

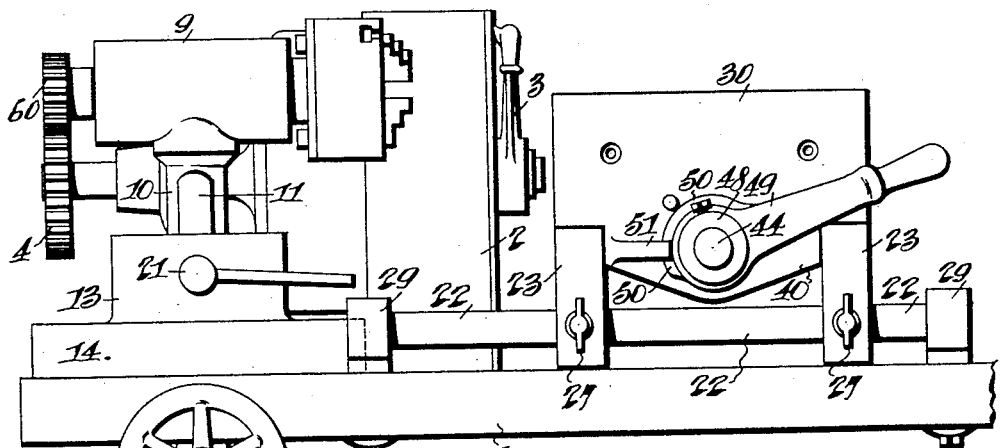
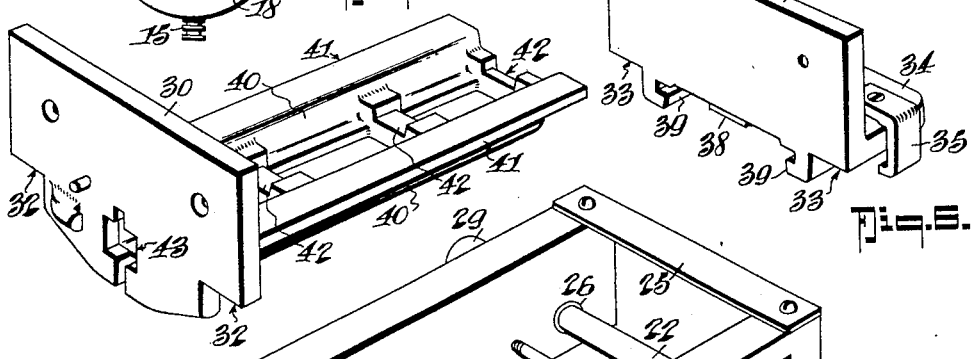
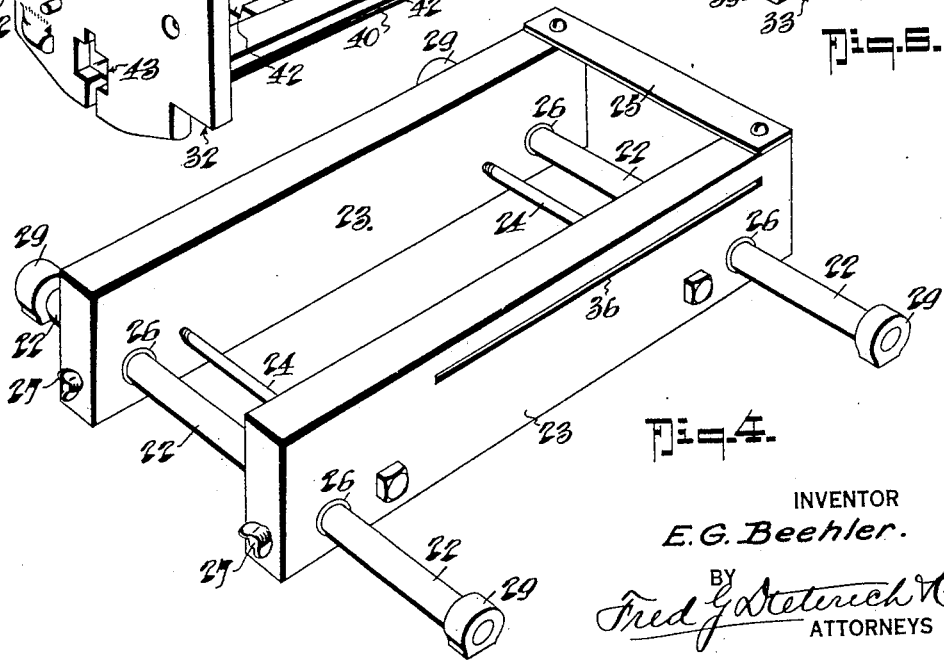

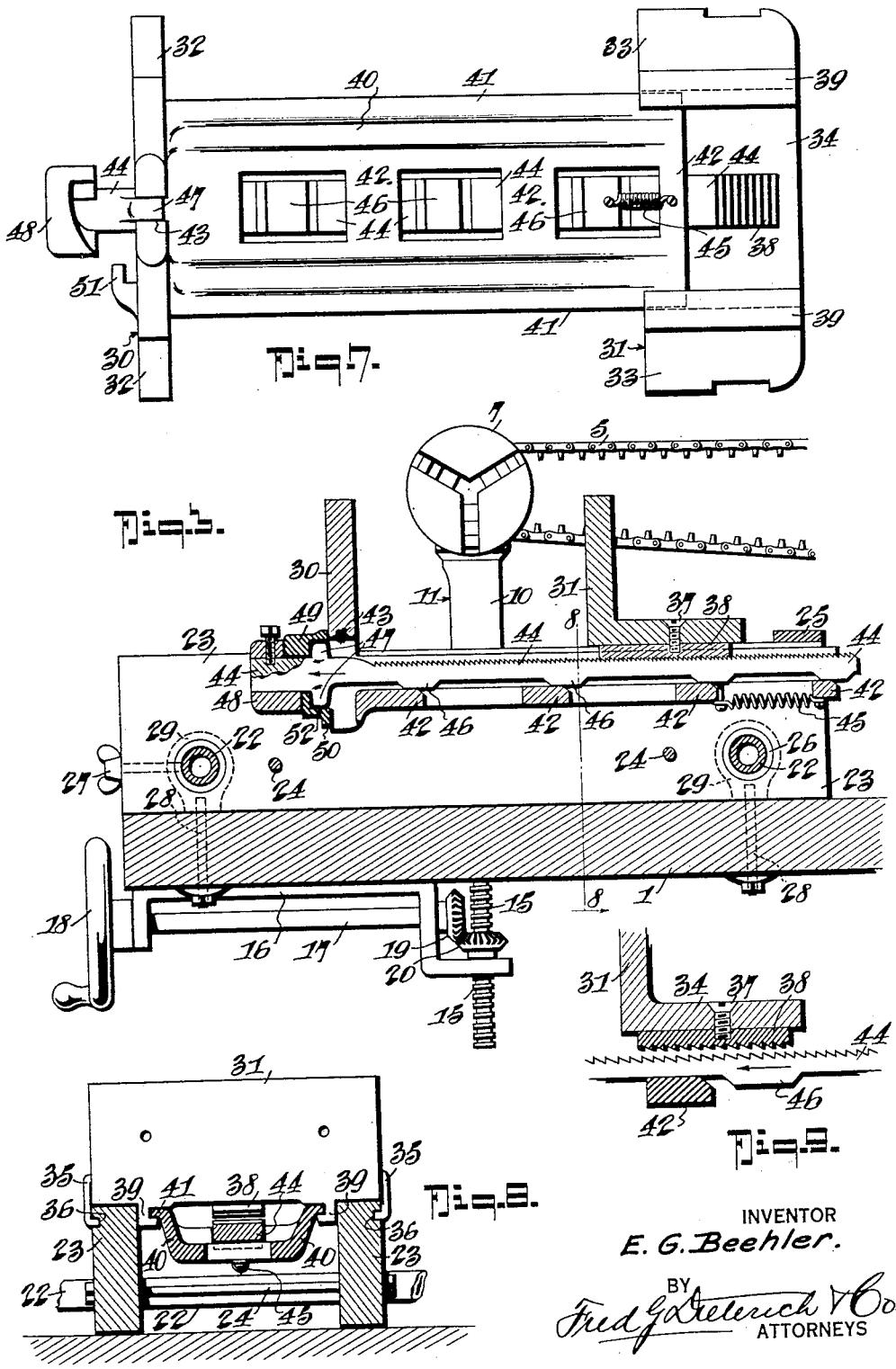

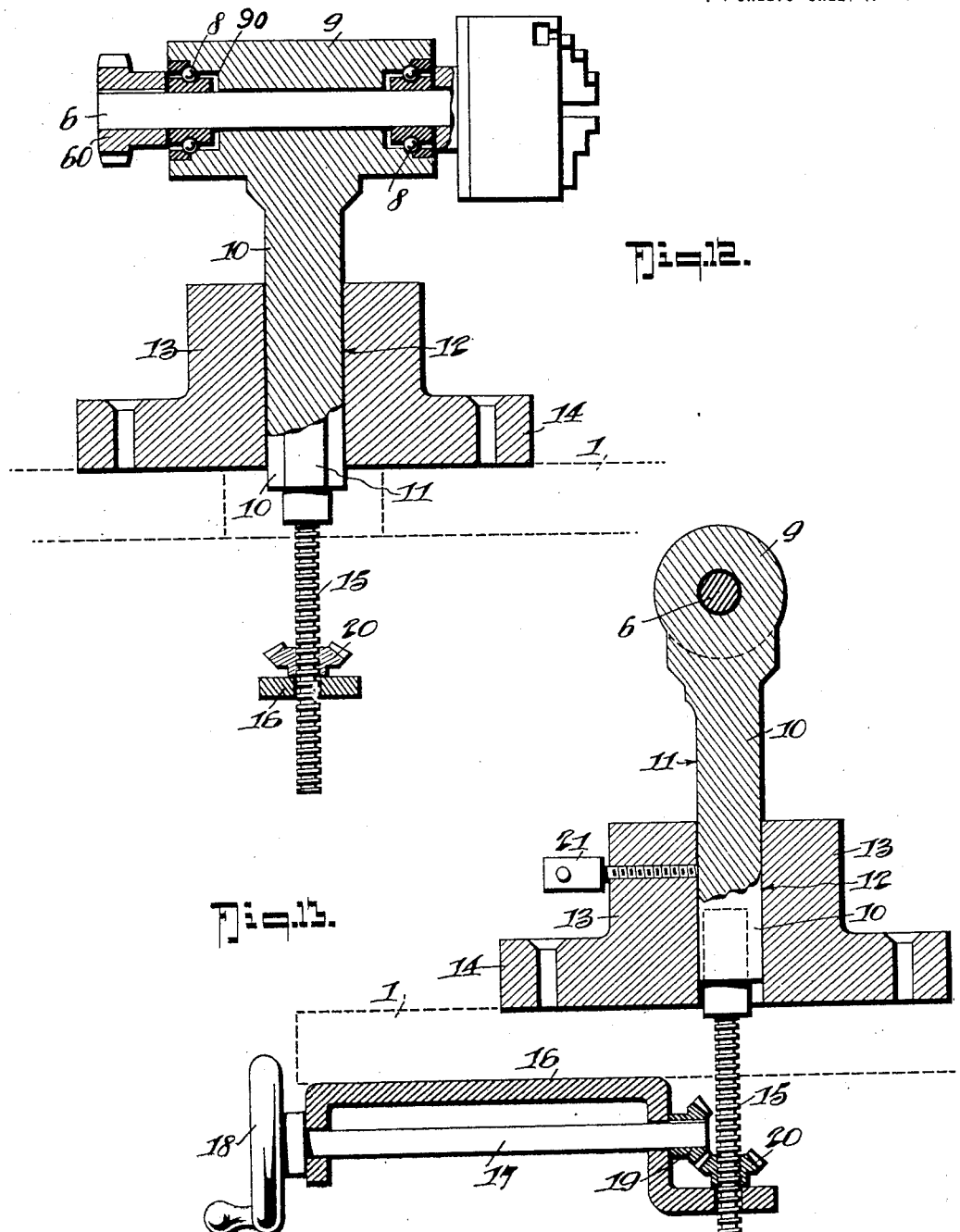

ELMER G. BEEHLER, OF YUMA, COLORADO.

AUTOMOTIVE TEST UNIT.

1,396,312. Specification of Letters Patent. Patented Nov. 8, 1921.

Application filed November 3, 1920. Serial No. 421,537.

*To all whom it may concern:*

Be it known that I, ELMER G. BEEHLER, a citizen of the United States, residing at Yuma, in the county of Yuma and State of Colorado, have invented certain new and useful Improvements in Automotive Test Units, of which the following is a specification.

This invention relates to certain new and useful improvements in apparatus or machines for testing purposes and more especially to a universal gripping means for holding and imparting rotary motion to automotive parts, such as motors, generators, magnetos and other motor vehicle electric equipments, and primarily my invention has for its purpose to provide an improved means of the general character referred to, whose coöperative parts are especially designed, whereby the article to be tested can be readily clamped in universal adjustable relation to the driving head, in itself adapted for vertical adjustment, such compound adjustments of the parts providing a relatively simple and compact means for readily testing a very wide range of shapes and sizes of electric equipment, such as above mentioned, in a convenient and expeditious manner, and whereby to provide for handling the testing means and the article being tested in a minimum amount of time.

With other objects in view, hereinafter apparent, my invention provides a testing means for the purposes stated, of a comparatively simple, compact, inexpensive and desirable nature, capable of testing automotive electrical equipment of very wide range of sizes and shapes, and embodying the peculiar features of construction and novel arrangement of parts hereinafter first described in detail, specifically pointed out in the appended claims, and illustrated in the accompanying drawings in which:

Figure 1 is a plan view of my improved construction of testing apparatus, as operatively mounted upon a testing table.

Fig. 2 is a side elevation of the parts shown in Fig. 1, looking in the direction of the arrow thereon.

Fig. 3 is a central longitudinal section taken through the clamping device or vise member and looking in the direction of the driving head.

Fig. 4 is a perspective view of the slidably adjustable base portion of the vise member.

Fig. 5 is a similar view of the main adjustable clamping jaw of the aforesaid vise member.

Fig. 6 is a similar view of the other adjustable clamping jaw thereof, hereinafter further mentioned.

Fig. 7 is an inverted plan view of the adjustable clamping jaws with the opposing rack members operatively assembled, but removed from the vise member base.

Fig. 8 is a central vertical cross section of the vise member, taken substantially on the line 8—8 on Fig. 3 and looking in the direction indicated by the arrow.

Fig. 9 is a detail sectional view that illustrates the manner in which the sliding rack bar, carried by the main clamping jaw, is forced into engagement with the rack member on the coöperating clamp jaw.

Fig. 10 is a detail perspective view of the vise clamping cam lever.

Fig. 11 is a detail perspective view of the sliding rack bar and its cam head mounted thereon.

Fig. 12 is a detail vertical longitudinal section taken through the vertically adjustable driving head and coöperative connections and Fig. 13 is a cross section thereof, and clearly illustrates the head elevating mechanism.

In the practical embodiment of my invention, as disclosed in the drawings, 1 designates a table or bench top upon which the parts, constituting my improved construction and arrangement of automotive test units, are operatively mounted coöperative with a reversible, variable speed motor 2, of any practical conventional type, and provided with a lever 3 for controlling the speed and direction of rotation of the said motor, and mounted on the motor shaft to rotate therewith is a toothed wheel 4 from which power is transmitted to the parts to which motion is to be applied in the manner presently explained.

For imparting rotary motion to the shaft of the article to be tested, and which is clamped in proper position by vise clamp devices hereinafter mentioned, a chuck head 7 is provided, which head may be of any well known practical type, which is keyed to driven shaft 6 journaled in suitable ball bearings 8 mounted in sockets 90 in a vertically adjustable head 9, as is best shown in Figs. 12 and 13, and the said shaft 6, at that end opposite the chuck carrying end, has an attached small toothed wheel 60 to which motion is imparted, through a silent endless chain connection 5, that engages with and receives motion from the transmission wheel 4 on the motor shaft, as is clearly illustrated in Fig. 1 of the drawings.

Referring now to Figs. 12 and 13 of the drawings it will be noted the vertically adjustable head member 9 is of cylindrical shape and has a pendent shank 10, integrally or otherwise fixedly connected with the head 9, and the said shank 10 has an interrupted or flattened bearing face 11 formed in its circular cross sectional contour, which face is adapted to pass through a similarly shaped bore 12 in a base member 13.

The base member 13 includes a circular flange 14 suitably provided with bolt passages whereby it may be readily secured to the bench or table, see Fig. 1.

For conveniently effecting vertical adjustment of the shank 10 and the head 9, the said shank 10 is provided, at its lower end, with a downwardly extended member, in the nature of screw 15, that extends freely through an opening provided therefor in the table 1.

17 designates an operating shaft that is horizontally disposed below the table 1 and journaled, at its opposite ends, in pendent angled portions of a bracket 16, suitably secured on the bottom of the table.

As is best shown in Fig. 13, the shaft 17 is provided with a hand wheel 18 at the outer end and a bevel gear 19 at the inner end. Gear 19 meshes with a beveled gear 20 that acts as an adjusting nut. it having a threaded aperture through which the screw shaft 15 passes, as shown.

By providing adjusting means as described and shown, it will be seen that by proper turning of the hand wheel 18, the rotating chuck carrying head 9 may be quickly raised or lowered, as desired, it being apparent that by reason of the cross sectional shape of the pendent member 10, that constitutes a part of the head member 9, and the guideway 12 in the base member 13, through which the member 10 passes, all possibility of the head member getting out of axial alinement with the shaft being turned for testing purposes is eliminated.

A screw clamp 21 that threads through the base 13 is provided for engaging the flattened face 11 of the shank portion 10 to thereby positively hold the said shank 10 and its head portion 9 to the different adjusted positions.

Thus far I have described the means for driving the shaft of the article to be tested, at predetermined speeds, and for raising and lowering the chuck carrying elements to the proper alinement with the aforesaid shaft for driving it.

In the operative assemblage of the parts constituting my complete testing means, mechanism is included for adjustably holding the article being tested and the said mechanism, best shown in Figs. 2 to 6, is explained as follows.

Mounted in heads 29 fastened to the table by bolts 28, are a pair of guide rails 22, which rails are spaced equidistantly from and disposed laterally of and are parallel to the axis of the chuck carrying shaft 6, the purpose of the said rails 22 being presently explained.

23—23 designate the side member of, what I term, the base of my construction of vise device, and the said members are held in proper relation by cross stays 24, and at their rear ends by a cross piece 25 that extends over the tops of the side members 23—23, the said cross piece 25 also forming a stop for one of the clamp members, as will be hereinafter further explained.

Each side member 23 is provided with a pair of slide bearings 26—26, through which the aforesaid guide rails 22—22 pass, and by referring to Figs. 2 and 4 it will be apparent that through the guide rail connection for the members 23—23 as shown and described, the vise device may be readily slid along such adjustment, with relation to the chuck head 7, as may be required, after which, through the medium of clamp screws 27 operable in the front of each side member 23, the vise base may be fixedly held to its adjusted positions.

30—31 designate a pair of opposite clamp members that are slidably mounted on the side members 23—23 before described, and having flattened and machined offset portions 32—33 for such purpose.

Clamp member 31 has an angled foot portion 34 and a pair of guide fingers 35, one at each end of the member 34, that project over the outer opposite edges of the member 34 and engage guide slots 36 in the side members 23 (see Fig. 8) for holding the said clamp member 31 to its operative positions on the side members 23 mentioned.

38 designates a small short rack member that is secured to the underside of the clamp member 34 by a screw 37, the purpose of which will presently appear.

The foot portion 34 of the member 31 also has pendent oppositely disposed guides 39—39 that form guide rests for engaging the corresponding edges 41—41 of rearward extensions 40 of the opposing clamp member 30.

By arranging the opposing clamp members as described and shown the said opposing members are free to slide along the opposite side bars at will.

The clamping members 30 and 31 when clamping are rigidly held to their adjusted positions, along the base members 23—23; and for such purpose the rearward extension 40 of the clamp jaw 30 has a series of cutout portions that constitute guide bearings 42, and insertible through a cross shaped opening 43 in the front face of the clamping member 30 is projected the rack bar 44, whose rack teeth face the teeth of the opposing rack member 38 (see Fig. 9), and the bottom of the clamp member 31, the said rack bar 44 having at times, a slight degree of forward movement, against the tension of the spring 45 fastened thereto and to the end of the extension 40 as is clearly shown in Figs. 3 and 7.

The rack bar 44 is also provided with a number of (corresponding to the number of bearing portions 42) cam members 46ª, the purpose of which will be presently explained, and at its forward end the rack bar 44 has a rounded shank portion having oppositely projected, upper and lower lugs 47—47 adapted for fitting within the upwardly and downwardly extended portions of the cross shaped aperture 43, for holding the said rack bar from rotation.

Secured upon the outer or round end of the rack bar 44, by a set screw, is a cam collar 48 adapted for being engaged by a like shaped cam face on a clamping lever 49 that is interposed between the aforesaid collar and the front face of the clamp jaw 30, as is best shown in Figs. 1 and 3. Lever 49 has a flange 50 and which is adapted for being engaged by an overhanging keeper 51 for holding the said lever to its proper position against the front face of the clamp jaw 30. The inner face of the lever has a recessed portion 52, corresponding to the cam face on the opposite or outer face thereof, for the purpose of forming recesses to accommodate the lugs 47—47 caused by the locking of the opposing clamp jaws 30—31 in the manner now to be described and as indicated in Fig. 3 of the drawings.

When it is desired to clamp an article to be tested, the said article is placed within the cam faces of the jaws 30 and 31 of the vise member, and the said jaws 30 and 31 are slid along the side base bars 23, until, the article to be worked on is in the desired position with relation to the chuck driving head 7, after which the cam lever 49 is turned, in a clockwise direction and, by reason of the cam faces mentioned engaging, causes the long rack bar to move forwardly (see Figs. 3 and 9) and by reason of the rack portions formed on the bar 44 engaging with the rack member 38 on the clamp member 31, forces the said clamp member 31 to tightly clamp the article in the desired position.

From the foregoing description taken in connection with the drawings, the complete constructions of, the manner in which the several parts may be readily manipulated and adjusted for the intended purpose and the advantages of my invention will be readily understood by those familiar with the handling or use of testing apparatus for the purpose described.

What I claim is:

1. In an automotive testing means of the character described, a suitable base or bed, a chuck carrying support, the said support including a bearing for the chuck head carrying shaft, means for holding equipment to be tested, the said means being supported upon the base, other means for effecting adjustment of the chuck carrying support at right angles to the equipment holder and means for adjusting the said holder laterally and longitudinally relatively to the said chuck head and means for effecting rotation of the chuck.

2. In an automotive testing means of the character described, the combination with a suitable bed and elements for holding equipment to be tested, the said elements being laterally and longitudinally adjustable with respect to the bed; of a chuck support comprising a bearing on the base, the said bearing having a vertical bore, a shank vertically slidable through the said bore, the said shank having a cross head, chuck carrying shaft journaled in said cross head, means for effecting vertical adjustment of the shank and the chuck and for holding the shank at its vertical adjustments.

3. In an automotive testing means of the character described, the combination with a suitable bed and elements for holding equipment to be tested, each element being laterally and longitudinally adjustable with respect to the bed; of a chuck support comprising a bearing on the base, the said bearing having a vertical bore, a shank vertically slidable through the said bore, the said shank having a cross head, a chuck carrying shaft journaled in said cross head, means for effecting vertical adjustment of the shank and the chuck and for holding the shank at its vertical adjustments, the said means comprising a feed screw that constitutes a pendent extension of the shank, a screw gear engaging the threaded shank and a hand operative shaft having a gear connection with the screw gear for effecting vertical shifting of the chuck support.

4. In an automotive testing means of the character described, the combination with a suitable bed and elements for holding the equipment to be tested, said elements being laterally and longitudinally adjustable with respect to the bed; of a chuck support, comprising a bearing on the base, the said bearing having a vertical bore, a shank vertically slidable through the said bore, the said shank having a cross head, a chuck carrying shaft journaled in said cross head, means for effecting vertical adjustment of the shank and the chuck and for holding the shank at its vertical adjustments, the said means comprising a feed screw that constitutes a pendent extension of the shank, a screw gear engaging the threaded shank and a hand operative shaft having a gear connection with the screw gear for effecting vertical shifting of the shank of the chuck support, the said shank and the bar in which it moves having coöperating means for preventing rotation of the shank of the chuck support.

5. In automotive equipment testing means of the character described, the combination with a bed, a chuck carrying head, a support therefor mounted on the bed and means for effecting vertical adjustment of the said chuck head support; of devices for holding the equipment to be tested, the said devices having lateral and longitudinal adjustment with respect to the chuck head and including opposing clamp members for engaging and holding the equipment, and means for effecting adjustment of the opposing clamp members to or from each other and for securing them to their adjusted positions.

6. In an automotive equipment testing means of the general character stated, a vise for holding the equipment unit to be tested, the said vise comprising a base composed of oppositely disposed and joined side members, means for effecting adjustment of the said side members, means for effecting adjustment of the said side members laterally, a pair of opposing clamps mounted upon the said side members for slidable adjustment to and from each other, and means for effecting a positive locking of the two clamps when adjusted for holding the equipment to be tested, the said means including opposing rack members normally held out of operative connection and means for adjusting the rack members to interengaged connection after the opposing clamp members have been moved in holding engagement with the equipment to be tested.

7. In an automotive equipment testing means of the general character stated, a vise for holding the equipment unit to be tested, the said vise comprising a base composed of oppositely disposed and joined side members, means for effecting adjustment of the said side members, means for effecting adjustment of the said side members laterally, a pair of opposing clamps mounted upon the said side members for slidable adjustment to and from each other, and means for effecting a positive locking of the two clamps when adjusted for holding the equipment to be tested, the said means including opposing rack members normally held out of operative connection and means for adjusting the rack members to interengaged connection after the opposing clamp members have been moved in holding engagement with the equipment to be tested, the said means including a cam lever adapted when swung in one direction to effect the positive locking of the clamps to their holding position and when swung in an opposite direction to provide for freely sliding the clamps on their supporting base.

8. A vise construction for automotive equipment testing means, comprising in combination with a supporting base composed of a pair of oppositely disposed and connected members; a pair of opposing clamps for engaging or holding the unit to be tested, the said clamp having endwise slidable connection with the aforesaid side members, one of the slidable clamps having a fixedly held rack member, a movably held rack member supported by the other clamp member, means tending to normally pull the said movable rack member in position for disengaging the opposing fixedly held rack, the said movable rack member and the clamp member on which it is supported having cam engaging portions, adapted when the said movable rack member is pulled back from its normally projected position to move the said movable rack into interlocking engagement with the fixed rack, a lever operated means connected with the said movable rack member, the clamp member for pulling the movable rack members into its cam engaging position for lifting the said movable rack members and for holding it in interlocking position with the opposing rack to thereby secure the clamps in a tight, gripped engagement with the article to be tested.

9. A vise construction for automotive testing mechanism of the character described, comprising a base composed of a pair of oppositely disposed connected side members, a pair of opposing clamps slidably supported upon and interlocked with the opposing side members, one of the clamps having a fixed rack member, a longitudinally extended rack member mounted on the other clamp projected between the opposing base side members and having a limited movement in direction of its length, means tending to pull the said movable rack member forwardly to its limit of movement in one direction whereby to hold the rack face that opposes the fixedly held rack on the other clamp out of engagement with the said fixed rack, lever actuated cam devices coöperative with the movable rack member and the clamp that carries it, for effecting backward movement of the said movable cam, and coöperative engaging means on the said movable rack and the clamp on which it is mounted for shifting the said movable rack into interlocked engagement with the fixedly held rack, whereby to hold the opposing clamps in tight gripping contact with the equipment to be tested.

ELMER G. BEEHLER.